(12) United States Patent
Sloane (10) Patent No.: US 11,979,484 B2
(45) Date of Patent: May 7, 2024

(54) SYSTEM FOR ELECTRONIC DATA ENCRYPTION AND DECRYPTION USING A CONSENSUS DRAFT PROCESS

(71) Applicant: BANK OF AMERICA CORPORATION, Charlotte, NC (US)

(72) Inventor: Brandon Sloane, Indian Land, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 188 days.

(21) Appl. No.: 17/381,882

(22) Filed: Jul. 21, 2021

(65) Prior Publication Data
US 2023/0028290 A1 Jan. 26, 2023

(51) Int. Cl.
*H04L 9/06* (2006.01)
*H04L 9/08* (2006.01)

(52) U.S. Cl.
CPC .......... *H04L 9/0618* (2013.01); *H04L 9/0816* (2013.01); *H04L 9/0825* (2013.01); *H04L 9/0838* (2013.01); *H04L 2209/46* (2013.01); *H04L 2209/80* (2013.01)

(58) Field of Classification Search
CPC . H04L 2209/46; H04L 2209/80; H04L 63/00; H04L 9/0816; H04L 9/0825; H04L 9/0838
See application file for complete search history.

(56) References Cited

U.S. PATENT DOCUMENTS

| | | | |
|---|---|---|---|
| 8,566,115 B2 | 10/2013 | Moore | |
| 9,026,805 B2 | 5/2015 | Acar et al. | |
| 9,569,771 B2 | 2/2017 | Lesavich et al. | |
| 9,942,031 B2 | 4/2018 | Kahrobaei et al. | |
| 10,425,230 B1 | 9/2019 | Tang et al. | |
| 10,447,478 B2 | 10/2019 | Gray | |
| 10,601,593 B2 | 3/2020 | Antonopoulos et al. | |
| 10,673,617 B1 | 6/2020 | Antoniou et al. | |
| 10,679,128 B2 | 6/2020 | Katz et al. | |
| 10,715,339 B1 | 7/2020 | Wei et al. | |
| 10,749,865 B2 | 8/2020 | Andrade | |
| 10,789,419 B2 | 9/2020 | Upadhyay et al. | |
| 10,797,861 B2 | 10/2020 | Li | |
| 11,063,770 B1 | 7/2021 | Peng | |
| 2016/0300223 A1 | 10/2016 | Grey et al. | |

(Continued)

*Primary Examiner* — Ellen Tran
(74) *Attorney, Agent, or Firm* — Moore & Van Allen PLLC; Seongun M. Hong (57) ABSTRACT

A system is provided for electronic data encryption and decryption using a consensus draft process. In particular, the system may use a custom encryption algorithm that generates an array with a number of entries that is dependent on the number of computing devices that participate in the encryption process. The encryption algorithm may cause a first computing device to open and read the array, randomly select and remove an entry, and pass on the remaining entries to a second computing device. The second computing device may then open and read the array, randomly select and remove an entry, then pass the remaining entries to a third computing device. The process may be executed in a reiterative manner until the entire array is distributed among the participating computing devices. In this way, encryption of data may be performed without revealing shared information among the participating computing devices.

20 Claims, 2 Drawing Sheets

(56) References Cited

U.S. PATENT DOCUMENTS

| | | |
|---|---|---|
| 2016/0350728 A1 | 12/2016 | Melika et al. |
| 2017/0243193 A1 | 8/2017 | Manian et al. |
| 2017/0338957 A1* | 11/2017 | Ateniese ................ H04L 9/085 |
| 2017/0353320 A1 | 12/2017 | Yang |
| 2018/0205546 A1 | 7/2018 | Haque et al. |
| 2018/0349621 A1* | 12/2018 | Schvey ................ G06F 21/645 |
| 2019/0140836 A1 | 5/2019 | Novak et al. |
| 2019/0140846 A1 | 5/2019 | Moore et al. |
| 2019/0253240 A1 | 8/2019 | Treat et al. |
| 2019/0325038 A1* | 10/2019 | Finlow-Bates ......... G06F 16/27 |
| 2019/0327077 A1 | 10/2019 | Mandal et al. |
| 2019/0349199 A1 | 11/2019 | Wang et al. |
| 2019/0386969 A1 | 12/2019 | Verzun et al. |
| 2020/0036512 A1 | 1/2020 | Vaikuntanathan et al. |
| 2020/0074548 A1* | 3/2020 | Aidoo ..................... H04L 47/82 |
| 2020/0389323 A1 | 12/2020 | Berg |
| 2021/0160080 A1 | 5/2021 | Struttmann et al. |
| 2021/0192653 A1 | 6/2021 | Hunn et al. |
| 2021/0224805 A1 | 7/2021 | Pennington et al. |

* cited by examiner

```
┌─────────────────────────────────────────────────────────┐
│ IDENTIFY AND SELECT A SET OF COMPUTING DEVICES FOR A    │
│ CONSENSUS DRAFT ENCRYPTION PROCESS, WHEREIN THE SET OF  │
│ COMPUTING DEVICES COMPRISES A FIRST TRUSTED COMPUTING   │
│ DEVICE AND A SECOND TRUSTED COMPUTING DEVICE            │
│ 201                                                     │
└─────────────────────────────────────────────────────────┘
                            │
                            ▼
┌─────────────────────────────────────────────────────────┐
│ GENERATE A DATA ARRAY COMPRISING A PLURALITY OF ENTRIES,│
│ WHEREIN EACH OF THE PLURALITY OF ENTRIES COMPRISES A    │
│ VALUE AND A POSITION WITHIN THE DATA ARRAY              │
│ 202                                                     │
└─────────────────────────────────────────────────────────┘
                            │
                            ▼
┌─────────────────────────────────────────────────────────┐
│ TRANSMIT THE DATA ARRAY TO THE FIRST TRUSTED COMPUTING  │
│ DEVICE                                                  │
│ 203                                                     │
└─────────────────────────────────────────────────────────┘
                            │
                            ▼
┌─────────────────────────────────────────────────────────┐
│ DETECT THAT THE FIRST TRUSTED COMPUTING DEVICE HAS      │
│ REMOVED AND STORED A FIRST ENTRY FROM THE PLURALITY OF  │
│ ENTRIES OF THE DATA ARRAY                               │
│ 204                                                     │
└─────────────────────────────────────────────────────────┘
                            │
                            ▼
┌─────────────────────────────────────────────────────────┐
│ TRANSFER THE DATA ARRAY FROM THE FIRST TRUSTED          │
│ COMPUTING DEVICE TO THE SECOND TRUSTED COMPUTING        │
│ DEVICE                                                  │
│ 205                                                     │
└─────────────────────────────────────────────────────────┘
```

FIG. 2

SYSTEM FOR ELECTRONIC DATA ENCRYPTION AND DECRYPTION USING A CONSENSUS DRAFT PROCESS

FIELD OF THE INVENTION

The present disclosure embraces a system for electronic data encryption and decryption using a consensus draft process.

BACKGROUND

In the field of data encryption, the system as described herein confers a number of technological advantages over conventional data encryption systems. For instance, by distributing an encryption key across multiple trusted computing devices, the system may ensure that no single computing device has the power to encrypt and/or decrypt certain datasets. In turn, this may increase the security of particularly sensitive data, as such data would be encrypted in such a way that multiple trusted computing devices must participate in the decryption process. In this way, encryption and decryption of data sets involving the distributed key may require the participation of multiple trusted computing devices, which in turn may increase the security of particularly sensitive data. In this way, the system may increase the security of sensitive data through the consensus draft encryption and decryption processes described herein.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for electronic data encryption and decryption using a consensus draft process. In particular, the system may use a custom encryption algorithm that generates an array with a number of entries that is dependent on the number of computing devices that participate in the encryption process. The encryption algorithm may cause a first computing device to open and read the array, randomly select and remove an entry, and pass on the remaining entries to a second computing device. The second computing device may then open and read the array, randomly select and remove an entry, then pass the remaining entries to a third computing device. The process may be executed in a reiterative manner until the entire array is distributed among the participating computing devices. In this way, encryption of data may be performed without revealing shared information among the participating computing devices.

Accordingly, embodiments of the present disclosure provide a system for electronic data encryption and decryption using a consensus draft process, the system comprising a memory device with computer-readable program code stored thereon; a communication device; and a processing device operatively coupled to the memory device and the communication device, wherein the processing device is configured to execute the computer-readable program code to identify and select a set of computing devices for a consensus draft encryption process, wherein the set of computing devices comprises a first trusted computing device and a second trusted computing device; generate a data array comprising a plurality of entries, wherein each of the plurality of entries comprises a value and a position within the data array; transmit the data array to the first trusted computing device; detect that the first trusted computing device has removed a first entry from the plurality of entries of the data array and stored the first entry in a memory device of the first trusted computing device; and transfer the data array without the first entry from the first trusted computing device to the second trusted computing device.

In some embodiments, the set of computing devices further comprises a terminal trusted computing device. In such embodiments, the computer-readable program code, when executed, further causes the processing device to detect that the second trusted computing device has removed a second entry from the plurality of entries of the data array and stored the second entry in a memory device of the second trusted computing device; and transfer the data array without the first entry and the second entry from the second trusted computing device to the terminal trusted computing device.

In some embodiments, the computer-readable program code, when executed, further causes the processing device to detect that the terminal trusted computing device has removed a third entry from the plurality of entries of the data array and stored the third entry in a memory device of the terminal trusted computing device; and transfer the data array without the first entry, the second entry, and the third entry from the terminal trusted computing device to the first trusted computing device.

In some embodiments, the computer-readable program code, when executed, further causes the processing device to detect that all of the plurality of entries have been removed from the data array; and generate a distributed key based on stored entries within each trusted computing device within the set of computing devices.

In some embodiments, the computer-readable program code, when executed, further causes the processing device to encrypt or decrypt a target data set through a cryptographic algorithm using the distributed key.

In some embodiments, the cryptographic algorithm is an asymmetric cryptographic algorithm.

In some embodiments, the cryptographic algorithm is a symmetric cryptographic algorithm.

Embodiments of the present disclosure also provide a computer program product for electronic data encryption and decryption using a consensus draft process, the computer program product comprising at least one non-transitory computer readable medium having computer-readable program code portions embodied therein, the computer-readable program code portions comprising executable code portions for identifying and select a set of computing devices for a consensus draft encryption process, wherein the set of computing devices comprises a first trusted computing device and a second trusted computing device; generating a data array comprising a plurality of entries, wherein each of the plurality of entries comprises a value and a position within the data array; transmitting the data array to the first trusted computing device; detecting that the first trusted computing device has removed a first entry from the plurality of entries of the data array and stored the first entry in a memory device of the first trusted computing device; and transferring the data array without the first entry from the first trusted computing device to the second trusted computing device.

In some embodiments, the set of computing devices further comprises a terminal trusted computing device. In such embodiments, the computer-readable program code portions further comprise executable code portions for detecting that the second trusted computing device has removed a second entry from the plurality of entries of the data array and stored the second entry in a memory device of the second trusted computing device; and transferring the data array without the first entry and the second entry from the second trusted computing device to the terminal trusted computing device.

In some embodiments, the computer-readable program code portions further comprise executable code portions for detecting that the terminal trusted computing device has removed a third entry from the plurality of entries of the data array and stored the third entry in a memory device of the terminal trusted computing device; and transferring the data array without the first entry, the second entry, and the third entry from the terminal trusted computing device to the first trusted computing device.

In some embodiments, the computer-readable program code portions further comprise executable code portions for detect that all of the plurality of entries have been removed from the data array; and generate a distributed key based on stored entries within each trusted computing device within the set of computing devices.

In some embodiments, the computer-readable program code portions further comprise executable code portions for encrypting or decrypting a target data set through a cryptographic algorithm using the distributed key.

In some embodiments, the cryptographic algorithm is an asymmetric cryptographic algorithm.

Embodiments of the present disclosure provide a computer-implemented method for electronic data encryption and decryption using a consensus draft process, wherein the computer-implemented method comprises identifying and select a set of computing devices for a consensus draft encryption process, wherein the set of computing devices comprises a first trusted computing device and a second trusted computing device; generating a data array comprising a plurality of entries, wherein each of the plurality of entries comprises a value and a position within the data array; transmitting the data array to the first trusted computing device; detecting that the first trusted computing device has removed a first entry from the plurality of entries of the data array and stored the first entry in a memory device of the first trusted computing device; and transferring the data array without the first entry from the first trusted computing device to the second trusted computing device.

In some embodiments, the set of computing devices further comprises a terminal trusted computing device. In such embodiments, the computer-implemented method further comprises detecting that the second trusted computing device has removed a second entry from the plurality of entries of the data array and stored the second entry in a memory device of the second trusted computing device; and transferring the data array without the first entry and the second entry from the second trusted computing device to the terminal trusted computing device.

In some embodiments, the computer-implemented method further comprises detecting that the terminal trusted computing device has removed a third entry from the plurality of entries of the data array and stored the third entry in a memory device of the terminal trusted computing device; and transferring the data array without the first entry, the second entry, and the third entry from the terminal trusted computing device to the first trusted computing device.

In some embodiments, the computer-implemented method further comprises detect that all of the plurality of entries have been removed from the data array; and generate a distributed key based on stored entries within each trusted computing device within the set of computing devices.

In some embodiments, the computer-implemented method further comprises encrypting or decrypting a target data set through a cryptographic algorithm using the distributed key.

In some embodiments, the cryptographic algorithm is an asymmetric cryptographic algorithm.

In some embodiments, the cryptographic algorithm is a symmetric cryptographic algorithm.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity. Accordingly, the term "user device" or "mobile device" may refer to mobile phones, personal computing devices, tablet computers, wearable devices, and/or any stationary or portable electronic device capable of receiving and/or storing data therein.

"Cryptographic function" or "cryptographic algorithm" as used herein may refer to a set of logical and/or mathematical operations or processes that may be executed on a specified segment of data to produce a cryptographic output (or "cypher"). In some embodiments, the cryptographic algorithm may be an algorithm such as Rivest-Shamir-Adleman ("RSA"), Shamir's Secret Sharing ("SSS"), or the like. In other embodiments, the cryptographic algorithm may be a hash algorithm which may, given a specified data input, produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Key" or "cryptographic key" as used herein may refer to data (e.g., a character string) which determines the manner in which an input is transformed into an output using a cryptographic algorithm (e.g., an encryption algorithm). Accordingly, "symmetric cryptography" or "symmetric key cryptography" may refer to a process for data encryption by which multiple users and/or devices use the same key to encrypt communications.

In performing encryption and/or decryption of electronic data, it may be desirable to require the input of multiple parties (e.g., computing systems) to perform the encryption and/or decryption processes. That said, it may also be desirable to perform the encryption and/or decryption process in such a way that the participants of the process do not reveal all of the shared information about the encryption and/or decryption process. In this regard, the system disclosed herein provides a way to perform encryption and decryption of data using a consensus draft process.

To this end, the system may select a plurality of computing devices as participants of an encryption and/or decryption process. The system may execute an encryption algorithm that uses a consensus draft process to generate a data array comprising a plurality of ordered, randomized entries (e.g., created using a random or pseudo-random number or value generator), where the number of randomized entries n may be greater than the number of participants p. A first participant may read the generated data array and identify for removal an entry within the data array having a position i, where i is selected randomly by the first participant. The first participant may remove the entry in position i from the data array and store the entry in the memory of the first participant.

Subsequently, the first participant may transmit the remaining data array (in which the entry in position i has been removed) to a second participant. The second participant may read the remaining data array (which now contains n−1 entries) and identify an entry within the data array having a position j, where j is selected randomly by the second participant. The second participant may remove the entry in position j from the array, store the entry in the memory of the second participant, and transmit the remaining data array (in which the entries in positions i and j have been removed) to a third participant. The process described above may be performed iteratively until the final participant has removed an entry from the data array. At this point, the final participant (after storing a randomized entry from the data array into memory), transfer the remaining data array to the first participant. In this manner, each participant may remove entries from the data array in turn until all of the entries have been removed from the data array and stored in a distributed manner across the participants. Once the data array has been distributed among the participants, the data array may be used to perform additional or secondary encryption and/or decryption functions. For instance, the distributed data array may be treated as a distributed key to be used in other cryptographic functions or algorithms.

A number of exemplary use cases of the system are described below for illustrative purposes only and are not intended to restrict or reduce the scope of the disclosure provided herein. In one embodiment, the distributed data array may serve as a key for use in symmetric encryption mechanisms (e.g., a XOR cipher) to encrypt a target data set. In such an embodiment, each of the participants hold a portion of the key (which may also be referred to herein as "key portions"), and may use its individual portion of the key to encrypt the corresponding portions of the data set. Because each participant may have a unique portion of the key, the resulting ciphertext for each run of the symmetric encryption algorithm may also be unique. Once all of the ciphers have been generated, the system may aggregate the encrypted data portions of the target data set in a manner that preserves cardinality (e.g., the order of the key portions). If the encrypted target data set is to be decrypted, the system may decrypt the individual encrypted data portion using the corresponding key portions to arrive at the unencrypted data set.

In another embodiment, the distributed data array may be used as a private key for asymmetric cryptographic algorithms (e.g., an RSA algorithm). In such an embodiment, the private key may comprise each of the randomized entries of the original data array in the order in which the randomized entries were stored. For instance, the private key may comprise, in order, the first entry stored by the first participant, the first entry stored by the second participant, the first entry stored by the third participant, and the like. In such a configuration, the "private key" may be partially shared such that each participant may derive some information about the private key, but also partially private such that the full private key may not be constructed from the entries stored by a single participant. For example, through the encryption process, some participants (e.g., the third participant during the first round) may know the positions of the entries within the original data array that were removed, but may not know the values of the removed entries or which participants have removed entries from the array and stored such entries in their respective memory devices. Once a new round of the encryption process begins (e.g., the data array returns to the first participant), the first participant may have some information about which of the original entries were removed (e.g., the positions and values of the removed entries) but may not know which participants have stored said removed entries.

The system as described herein confers a number of technological advantages over conventional data encryption systems. For instance, by distributing an encryption key across multiple trusted computing devices, the system may ensure that no single computing device has the power to encrypt and/or decrypt certain datasets. In turn, this may increase the security of particularly sensitive data, as such data would be encrypted in such a way that multiple trusted computing devices must participate in the decryption process.

Figure 1:
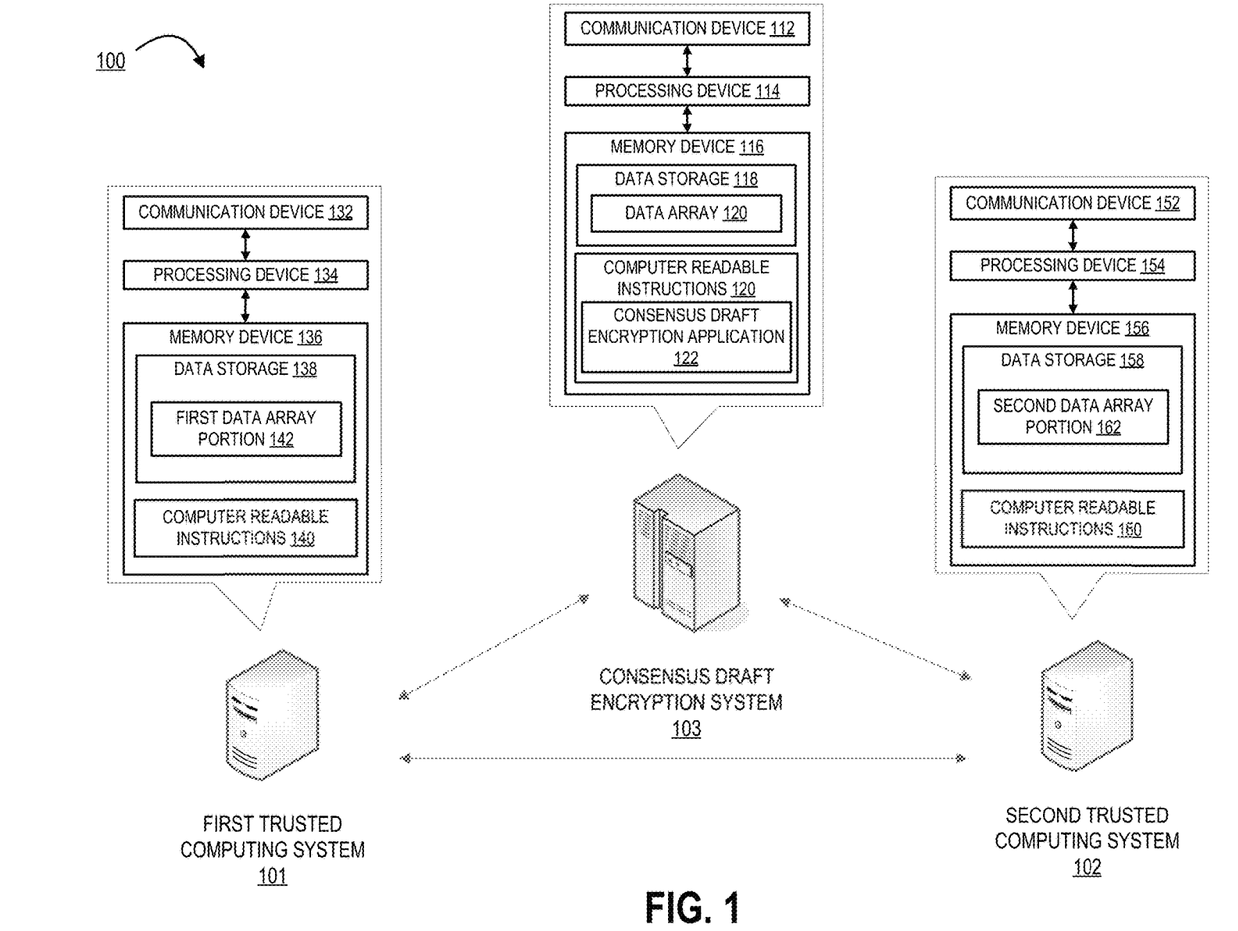
FIG. 1 illustrates an operating environment for the consensus draft encryption system, in accordance with one embodiment of the present disclosure.

Turning now to the figures, FIG. 1 illustrates an operating environment 100 for the consensus draft encryption system, in accordance with one embodiment of the present disclosure. In particular, FIG. 1 illustrates a consensus draft encryption system 103 that is operatively coupled, via a network, to an entity computing system 101 and/or a second trusted computing system 102. In such a configuration, the consensus draft encryption system 103 may transmit information to and/or receive information from the first trusted computing system 101 and/or the second trusted computing system 102.

It should be understood by one skilled in the art that FIG. 1 illustrates only an exemplary embodiment of the operating environment 100, and it will be appreciated that the operating environment 100 may comprise a fewer or greater number of computing systems and/or devices than are depicted in FIG. 1. For example, though FIG. 1 depicts the first trusted computing system 101 and second trusted computing system 102, some embodiments of the operating environment may comprise additional trusted computing systems (e.g., a third trusted computing system, fourth trusted computing system, and the like). It should also be understood that one or more functions of the systems, devices, or servers as depicted in FIG. 1 may be combined into a single system, device, or server. For instance, in some embodiments, some or all of the functions of the first trusted computing system 101 may be performed by the consensus draft encryption system 103, or conversely, some or all of the functions of the consensus draft encryption system 103 may be performed by the first trusted computing system 101. Furthermore, a single system, device, or server as depicted in FIG. 1 may represent multiple systems, devices, or servers. For instance, though the consensus draft encryption system 103 is depicted as a single unit, the functions of the consensus draft encryption system 103 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the consensus draft encryption system 103 may be a computing system such as a networked server or terminal within the network environment which coordinates the data encryption processes described herein (e.g., generate the original data array, monitor and/or coordinate the consensus draft mechanism, coordinating and/or performing encryption and/or decryption of target data sets using the distributed key, and the like). Accordingly, the consensus draft encryption system 103 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the first trusted computing system 101 and/or the second trusted computing system 102. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a data array 120, which may be a data string generated by the consensus draft encryption system 103. The data array 120 may serve as the basis for generating the distributed key through the consensus draft encryption process. To this end, the consensus draft encryption system 103 may perform the generation of the data array 120 and initiate the consensus draft encryption process (e.g., by transmitting the data array 120 to the first trusted computing system 101).

The memory device 116 may further have computer-readable instructions 120 stored thereon, where the computer-readable instructions 120 may comprise a consensus draft encryption application 122, which may comprise computer-executable program code that may instruct the processing device 114 to perform certain logic, data processing, and data storing functions of the application to accomplish the entity's objectives. For instance, the consensus draft encryption application 122 generate the data array 120, initiate and coordinate the consensus draft encryption process (e.g., by defining the size of the data array 120, identifying and selecting participants, tracking a flow of the data set 120 between participants, tracking the order of participants in the encryption process, and the like).

As further illustrated in FIG. 1, the operating environment 100 may further comprise a first trusted computing system 101 in operative communication with the consensus draft encryption system 103 and/or the second trusted computing system 102. In particular, the first trusted computing system 101 may be a computing system that has been identified and selected by the consensus draft encryption system 103 as the first participant in the consensus draft encryption process. Accordingly, the first trusted computing system 101 may receive the data array 120 from the consensus draft encryption system 103 and subsequently remove one or more entries from the data array 120 and store said entries within the memory of the first trusted computing system 101.

The first trusted computing system 101 may comprise a processing device 134 operatively coupled to a communication device 132 and a memory device 136 having data storage 138 and computer readable instructions 140 stored thereon. The data storage 138 may comprise a first data array portion 142, which may comprise the one or more entries from the original data array 120 that have been removed from the data array by the first trusted computing system 101 according to the consensus draft encryption algorithm as described elsewhere herein. The first trusted computing system 101 may further be configured to transmit the remaining data array (e.g., the data array 120 minus the entry that has been removed by the first trusted computing system 101) to the second trusted computing system 102.

In some embodiments, the operating environment 100 may further comprise a second trusted computing system 102. The second trusted computing system 102 may computing system that has been identified and selected as the second participant in the consensus draft encryption process. In this regard, the second trusted computing system 102 may receive the remainder of the data array 120 once the first trusted computing system 101 has removed an entry from the data array 120.

The second trusted computing system 102 may comprise a processing device 154 operatively coupled to a communication device 152 and a memory device 156, the memory device 156 comprising data storage 158 and computer readable instructions 160. The data storage 158 of the second trusted computing system 102 may comprise a second data array portion 162, where the second data array portion 162 may comprise one or more entries that have been removed from the data array 120 by the second trusted computing system 102 through the consensus draft encryption process. The second trusted computing system 102 may then transmit the remainder of the data array 120 to the next participant (e.g., a third trusted computing system, a fourth trusted computing system, back to the first trusted computing system 101, or the like).

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like. For instance, the computing systems may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with a user.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random-Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
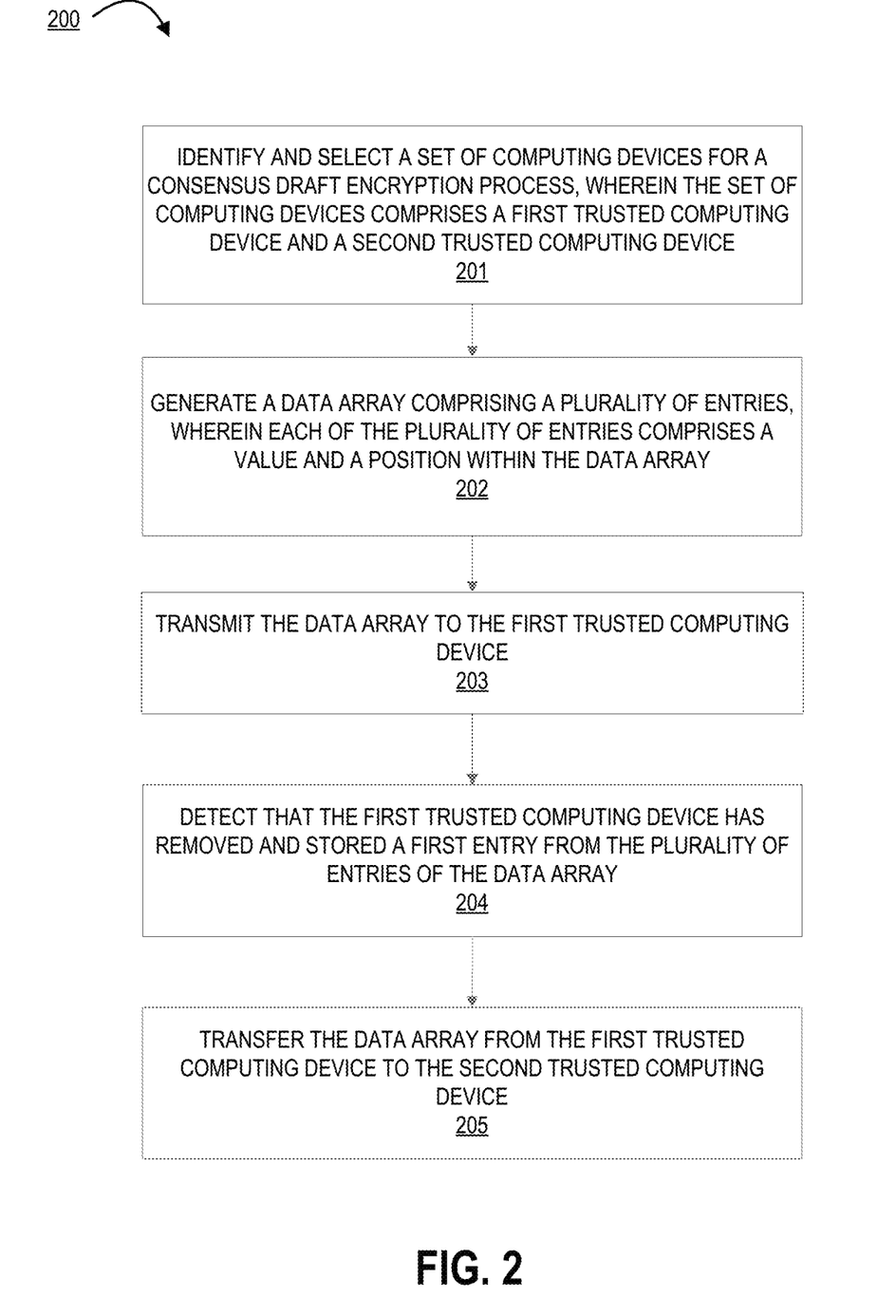
FIG. 2 illustrates a process flow for electronic data encryption and decryption using a consensus draft process, in accordance with one embodiment of the present disclosure.

FIG. 2 illustrates a process flow 200 for electronic data encryption and decryption using a consensus draft process, in accordance with one embodiment of the present disclosure. The process begins at block 201, where the system identifies and selects a set of computing devices for a consensus draft encryption process, wherein the set of computing devices comprises a first trusted computing device and a second trusted computing device. Each of the selected computing devices may serve as participants in the consensus draft encryption process. Accordingly, the selected computing devices may, in some embodiments, be trusted computing devices associated with an entity that wishes to distribute an encryption key across said trusted computing devices. In this way, encryption and decryption of data sets involving the distributed key may require the participation of multiple trusted computing devices, which in turn may increase the security of particularly sensitive data.

The process continues to block 202, where the system generates a data array comprising a plurality of entries, wherein each of the plurality of entries comprises a value and a position within the data array. In this regard, the data array may be a string of characters and/or numbers (e.g., a hash). The size of the array (e.g., the number of entries within the data array) may be determined based on the number of trusted computing devices that are participating in the consensus draft encryption process. In particular, the system may select a data array size to have a greater number of entries than the number of participants. In some embodiments, the data array size may be selected by the system based on the target data set to be encrypted and/or the secondary cryptographic algorithms to be used with the distributed key.

The process continues to block 203, where the system transmits the data array to the first trusted computing device. Once the data array has been generated, the data array may be passed to the first participant in the chain of participants (e.g., the first trusted computing device). Each of the participants in the chain may take turns removing a randomized entry from the data array until all digits of the data array have been distributed across the various participants. If the last participant in the chain (e.g., a terminal trusted computing device) has removed an entry and the data array still contains one or more entries, the terminal trusted computing device may pass the remaining data array back to the first trusted computing device to continue the consensus draft process until all of the digits of the data array have been removed from the array and stored in the respective memory devices of the participants.

The process continues to block 204, where the system detects that the first trusted computing device has removed a first entry from the plurality of entries of the data array and stored the first entry in a memory device of the first trusted computing device. The first trusted computing device may read the data array and select and remove a randomized entry (e.g., a random digit within the data array) and store the removed entry in the memory of the first trusted computing device. At this stage, the remaining portion of the data array may be passed onto the next participant in the chain.

The process continues to block 205, where the system transfers the data array without the first entry from the first trusted computing device to the second trusted computing device. At this stage, the data array may be the original data array minus the randomized entry that has been removed by the first trusted computing device. To continue the consensus draft process, the second trusted computing device may select and remove a randomized entry (e.g., a second entry) from the data array and pass the remaining data array to the next participant (e.g., a third trusted computing device). This process may continue until the terminal trusted computing device is reached, at which point the data array (if not empty) may be passed back to the first trusted computing device.

Once the data array has been distributed across all of the participants, the entries stored by the participants may collectively make up a distributed key, which may be used for various types of secondary encryption processes. For instance, the distributed key may be used in symmetrical or asymmetrical cryptographic functions to encrypt or decrypt a target data set. In such embodiments, the system may aggregate, in order, the randomized entries from each of the participants (e.g., the first trusted computing device, the second trusted computing device, and the like), combine (e.g., concatenate) the randomized entries, and use the distributed key to encrypt or decrypt the data set. In this way, the system may increase the security of sensitive data through the consensus draft encryption and decryption processes described herein.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for electronic data encryption and decryption using a consensus draft process, the system comprising:
    a memory device with computer-readable program code stored thereon;
    a communication device; and
    a processing device operatively coupled to the memory device and the communication device, wherein the processing device is configured to execute the computer-readable program code to:
        identify and select a set of computing devices for a consensus draft encryption process, wherein the set of computing devices comprises a first trusted computing device and a second trusted computing device;
        generate a data array comprising a plurality of entries, wherein each of the plurality of entries comprises a value and a position within the data array, wherein each of the plurality of entries within the data array are generated using a random value generator, wherein a total number of entries within the data array is greater than a total number of computing devices within the set of computing devices, wherein the data array is a cryptographic key;
        transmit the data array to the first trusted computing device;
        detect that the first trusted computing device has removed a first entry from the plurality of entries of the data array and stored the first entry in a memory device of the first trusted computing device; and
        transfer the data array without the first entry from the first trusted computing device to the second trusted computing device.

2. The system according to claim 1, wherein the set of computing devices further comprises a terminal trusted computing device, wherein the computer-readable program code, when executed, further causes the processing device to:
    detect that the second trusted computing device has removed a second entry from the plurality of entries of the data array and stored the second entry in a memory device of the second trusted computing device; and
    transfer the data array without the first entry and the second entry from the second trusted computing device to the terminal trusted computing device.

3. The system according to claim 2, wherein the computer-readable program code, when executed, further causes the processing device to:
    detect that the terminal trusted computing device has removed a third entry from the plurality of entries of the data array and stored the third entry in a memory device of the terminal trusted computing device; and
    transfer the data array without the first entry, the second entry, and the third entry from the terminal trusted computing device to the first trusted computing device.

4. The system according to claim 1, wherein the computer-readable program code, when executed, further causes the processing device to:
    detect that all of the plurality of entries have been removed from the data array; and
    generate a distributed key based on stored entries within each trusted computing device within the set of computing devices.

5. The system according to claim 4, wherein the computer-readable program code, when executed, further causes the processing device to encrypt or decrypt a target data set through a cryptographic algorithm using the distributed key.

6. The system according to claim 5, wherein the cryptographic algorithm is an asymmetric cryptographic algorithm.

7. The system according to claim 5, wherein the cryptographic algorithm is a symmetric cryptographic algorithm.

8. A computer program product for electronic data encryption and decryption using a consensus draft process, the computer program product comprising at least one non-transitory computer readable medium having computer-readable program code portions embodied therein, the computer-readable program code portions comprising executable code portions for:
    identifying and select a set of computing devices for a consensus draft encryption process, wherein the set of computing devices comprises a first trusted computing device and a second trusted computing device;
    generating a data array comprising a plurality of entries, wherein each of the plurality of entries comprises a value and a position within the data array, wherein each of the plurality of entries within the data array are generated using a random value generator, wherein a total number of entries within the data array is greater than a total number of computing devices within the set of computing devices, wherein the data array is a cryptographic key;
    transmitting the data array to the first trusted computing device;
    detecting that the first trusted computing device has removed a first entry from the plurality of entries of the data array and stored the first entry in a memory device of the first trusted computing device; and
    transferring the data array without the first entry from the first trusted computing device to the second trusted computing device.

9. The computer program product according to claim 8, wherein the set of computing devices further comprises a terminal trusted computing device, wherein the computer-readable program code portions further comprise executable code portions for:
  detecting that the second trusted computing device has removed a second entry from the plurality of entries of the data array and stored the second entry in a memory device of the second trusted computing device; and
  transferring the data array without the first entry and the second entry from the second trusted computing device to the terminal trusted computing device.

10. The computer program product according to claim 9, wherein the computer-readable program code portions further comprise executable code portions for:
  detecting that the terminal trusted computing device has removed a third entry from the plurality of entries of the data array and stored the third entry in a memory device of the terminal trusted computing device; and
  transferring the data array without the first entry, the second entry, and the third entry from the terminal trusted computing device to the first trusted computing device.

11. The computer program product according to claim 8, wherein the computer-readable program code portions further comprise executable code portions for:
  detect that all of the plurality of entries have been removed from the data array; and
  generate a distributed key based on stored entries within each trusted computing device within the set of computing devices.

12. The computer program product according to claim 11, wherein the computer-readable program code portions further comprise executable code portions for encrypting or decrypting a target data set through a cryptographic algorithm using the distributed key.

13. The computer program product according to claim 12, wherein the cryptographic algorithm is an asymmetric cryptographic algorithm.

14. A computer-implemented method for electronic data encryption and decryption using a consensus draft process, wherein the computer-implemented method comprises:
  identifying and select a set of computing devices for a consensus draft encryption process, wherein the set of computing devices comprises a first trusted computing device and a second trusted computing device;
  generating a data array comprising a plurality of entries, wherein each of the plurality of entries comprises a value and a position within the data array, wherein each of the plurality of entries within the data array are generated using a random value generator, wherein a total number of entries within the data array is greater than a total number of computing devices within the set of computing devices, wherein the data array is a cryptographic key;
  transmitting the data array to the first trusted computing device;
  detecting that the first trusted computing device has removed a first entry from the plurality of entries of the data array and stored the first entry in a memory device of the first trusted computing device; and
  transferring the data array without the first entry from the first trusted computing device to the second trusted computing device.

15. The computer-implemented method according to claim 14, wherein the set of computing devices further comprises a terminal trusted computing device, wherein the computer-implemented method further comprises:
  detecting that the second trusted computing device has removed a second entry from the plurality of entries of the data array and stored the second entry in a memory device of the second trusted computing device; and
  transferring the data array without the first entry and the second entry from the second trusted computing device to the terminal trusted computing device.

16. The computer-implemented method according to claim 15, wherein the computer-implemented method further comprises:
  detecting that the terminal trusted computing device has removed a third entry from the plurality of entries of the data array and stored the third entry in a memory device of the terminal trusted computing device; and
  transferring the data array without the first entry, the second entry, and the third entry from the terminal trusted computing device to the first trusted computing device.

17. The computer-implemented method according to claim 14, wherein the computer-implemented method further comprises:
  detect that all of the plurality of entries have been removed from the data array; and
  generate a distributed key based on stored entries within each trusted computing device within the set of computing devices.

18. The computer-implemented method according to claim 17, wherein the computer-implemented method further comprises encrypting or decrypting a target data set through a cryptographic algorithm using the distributed key.

19. The computer-implemented method according to claim 18, wherein the cryptographic algorithm is an asymmetric cryptographic algorithm.

20. The computer-implemented method according to claim 18, wherein the cryptographic algorithm is a symmetric cryptographic algorithm.

* * * * *